Patented Aug. 15, 1944

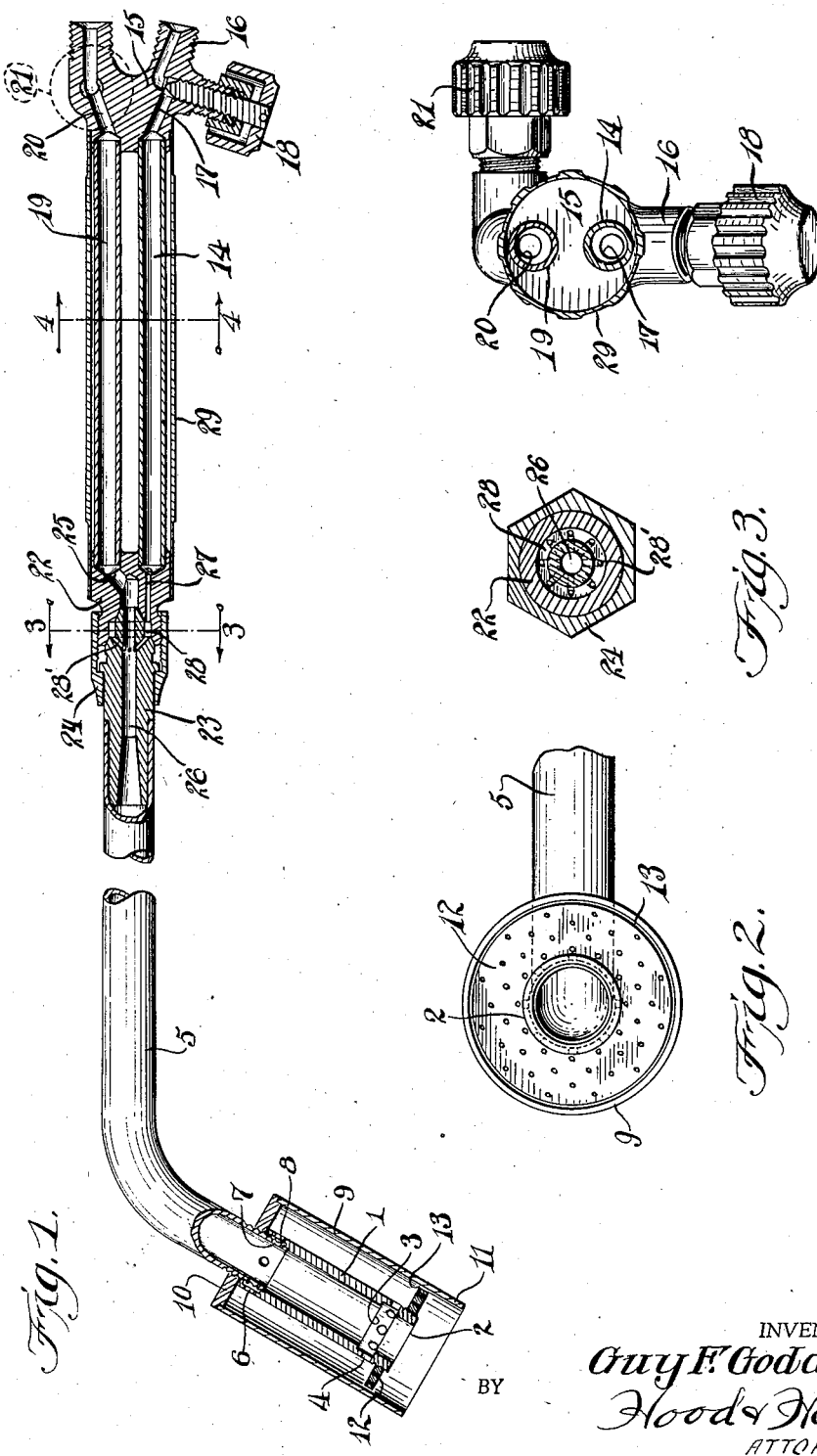

2,356,048

UNITED STATES PATENT OFFICE 2,356,048

PREHEATING TORCH

Guy F. Goddeau, Chicago, Ill., assignor to The Liquid Carbonic Corporation, Chicago, Ill., a corporation of Delaware Application January 5, 1942, Serial No. 425,640

1 Claim. (Cl. 158—27.4)

The present invention relates to improvements in heating torches primarily of that type using an inflammable gas or mixture of inflammable gases for delivering and directing a flame against the part to be heated.

More particularly, my invention relates to a type of heating torch adapted to use a mixture of propane and air to produce an oxygen propane flame.

One of the objects of my invention is to provide a heating torch particularly adapted for use in connection with air and an inflammable gas such as propane and to provide means whereby the flame delivered from the burner nozzle of the torch will be maintained ignited, irrespective of the fact that the products of combustion are delivered through said nozzle at a relatively high velocity.

Another object of my invention is to provide a heating torch wherein a relatively large flame may be delivered thereby, part of the products of production being delivered through the nozzle of the torch at a relatively high velocity and part of the products of combustion being delivered at the heating nozzle at a relatively low velocity.

Another object of my invention is to provide a torch having the above characteristics, whereby blow-backs will be prevented in the torch and whereby the danger of flare-backs of the ignited products of combustion through the torch and into the handle, as well as the hose connections of the torch, will be prevented.

For the purpose of disclosing my invention, I have illustrated an embodiment thereof in which:

Fig. 1 is a longitudinal sectional view of my torch, part of the same, however, being shown in elevation;

Fig. 2 is an end view of the flame end of the torch;

Fig. 3 is a sectional view on the line 3, 3 of Fig. 1; and

Fig. 4 is a sectional view on the line 4, 4 of Fig. 1.

In the embodiment of the invention illustrated, I provide a nozzle 1 which is cylindrical in construction and is provided with a delivery end 2, the inner diameter of which is slightly less than the diameter of the tubular portion 1 of the nozzle.

Immediately behind the delivery end 2 of the nozzle, the nozzle portion 1 is provided with an annular groove 3 and in the walls of this annular groove, I provide a series of openings 4 extending to the periphery of the nozzle. This nozzle is secured upon the tubular extension 5 of the handle by threading or otherwise and, at its inner end, the nozzle 1 is likewise provided with outlet openings 6 adapted to coincide with outlet openings 7 in the extension 5. To insure a register between the opening 6 and the opening 7, that portion of the nozzle 1 extending over the tubular extension 5 is slightly reduced in diameter, as at 8, so that an annular chamber is formed between the end of the extension 5 and the nozzle portion 1. By this arrangement, even though the openings 7 and 6 are not in exact register, passage of products of combustion to the exterior of the nozzle 1 is provided for.

Surrounding the nozzle 1 is a cup-shaped secondary nozzle 9, the bottom 10 of which is preferably threaded on the end of the tubular extension 5. The side walls of this cup-shaped secondary nozzle extend, as at 11, beyond the tip 2 of the nozzle and, at the tip 2, I provide a foraminous baffle 12 which is slightly spaced from the side walls of the cup, as at 13, and is provided with a series of relatively small openings therein. This baffle is preferably screw-threaded on the tip end of the nozzle 1. This arrangement permits of the escape, at the bottom end of the nozzle, through the openings 6 and 7 of a certain portion of the products of combustion, which products of combustion pass into the chamber formed by the cup 9 and thence pass out through the passages around and in the baffle 13. By this arrangement, certain proportions of the products of combustion are delivered through the baffle at a materially reduced pressure and are, therefore, under no danger of being blown out as the result of the velocity of the products of combustion passing through the nozzle proper. I am thus enabled to maintain the products of combustion passing out of the nozzle proper ignited under practically all circumstances. Due to the fact that the baffle 12 offers a certain resistance to the passage of these low pressure products of combustion, such products as do not pass through the openings provided in the secondary nozzle will pass back into the primary nozzle through the openings 4 to mingle with the products of combustion delivered through the nozzle proper.

This nozzle is supplied with suitable products of combustion which may be a mixture of propane gas and air by the delivery tube 5. This delivery tube receives the products of combustion from the propane tube 14 terminating at one end in a valve block 15. This block is provided with a threaded nipple 16 to which the propane supply hose may be connected and is provided with an inlet port 17 controlled by a threaded adjustable valve 18 whereby the supply of propane may be regulated. Air is supplied through the medium of an air tube 19 likewise connected at its rear end to the valve block 15. This valve block is provided with a passage 20 controlled by a threaded valve 21 similar to the valve 18.

The opposite ends of these tubes terminate in a mixing block 22 which has secured thereon a stem 23. The stem and block are preferably connected together by a coupling screw 24. The air tube 19 delivers through an air passage 25 to the delivery passage 26 which, in turn, delivers to the delivery tube 5 into which the stem 23 is fitted. The gas tube 14 delivers through a passage 27 which, it will be noted, is much smaller in diameter than the passage 25, which passage terminates in an annular chamber 28 surrounding the rear end of the stem 23. This chamber communicates with the passage 26 through suitable ports 28'.

The mixer block, with its associated ports and chambers, as above described, provides a mixer for thoroughly mixing the delivered air and propane prior to its passage through the delivery tube 5 and to the heating nozzle proper.

A suitable enclosing shell 29 surrounds the tubes 14 and 19 receiving the mixing block and the valve block in its ends, and providing a handle by which the torch may be grasped.

In operation, the propane gas is fed to its tube 14 through the valve 18 at a relatively low pressure, say a pressure of three to fifteen pounds. The air is fed to the air tube 19 through its valve at a relatively high pressure, say at a pressure of 100 pounds. The air and propane passing into the mixing block and the passages and chambers provided therein become thoroughly mixed before being delivered to the nozzle. Due to the fact that the products of combustion thus formed are delivered through the nozzle at such a relatively high velocity, unless these products of combustion were maintained in an ignited state by some other means than merely igniting them initially, there would be danger of the torch blowing itself out, due to the high velocity of the products of combustion. Accordingly, as above described, a certain proportion of these products of combustion are by-passed into the cup 9 wherein the pressure is materially reduced and flowing out through the baffle burn without the danger of being blown out by the velocity at the nozzle and thereby maintain the primary products of combustion ignited.

In a torch of this character, there is sometimes danger of a flare-back or blow-back of the products of combustion as, for instance, wherein the torch is placed in extremely close proximity to the work to be heated. This blow-back or flare-back of ignited gases tends to travel back through the torch and would have a tendency even to follow the propane back into the hose. The propane gas is delivered at comparatively low pressure and, therefore, the burning products of combustion would follow the paths of less resistance, which would be the low pressure side. However, by the arrangement of the mixture, as above described, it is to be noted that the air is being delivered through the tube 19 and the passage 25 at relatively high velocity. Therefore, when the ignited products of combustion tend to pass into the passages 26 and 27, the velocity of the air passing through the passage 25 and across the openings 28 will carry with it this flare-back gas and thus blow the flare-back flame out of the nozzle.

Of course, my torch lends itself to the burning of other mixtures than above identified. However, I have found that my torch lends itself to the burning of propane gas mixed with air. Primarily, of course, the mixture is one of oxygen and propane. In order, however, to get a sufficient supply of oxygen from the air, it is necessary to deliver a high percentage of air to the burner and for this reason, the air is delivered at a much higher pressure than that of the propane. By this arrangement, with a relative pressure of 100 pounds for the air and 15 pounds for the propane, I am enabled to get sufficient oxygen for mixture with the air to provide satisfactory combustion.

Obviously, if pure oxygen were used in place of air, the oxygen would be delivered through the air tube at a materially reduced pressure. However, I have found that, by the use of the above-described structure, I am enabled to use air instead of pure oxygen, thereby effecting a material saving in the operation of the torch.

I claim as my invention:

In a heating torch, in combination, a burner nozzle through which the products of combustion are adapted to be delivered at a relatively high velocity, said nozzle comprising a cylindrical tube open from end to end and forming a continuation of the combustion feeding tube and surrounding the outer end of said combustion feeding tube, the outer end of said combustion feeding tube having gas escape ports therein and said nozzle, at the point where it surrounds said tube, having an annular channel communicating with said ports and having gas escape ports communicating with said channel, the outer end of said nozzle having an annular channel formed therein in advance of the delivery end of said nozzle and having ports communicating with said channel, a foraminous baffle plate surrounding the delivery end of said nozzle beyond said second-mentioned ports, and a secondary nozzle surrounding and spaced from said burner nozzle having a bottom receiving said combustion feeding tube and having its end open and extending beyond the tip of the burner nozzle.

GUY F. GODDEAU.